US011386681B2

(12) United States Patent
Gotoh

(10) Patent No.: US 11,386,681 B2
(45) Date of Patent: Jul. 12, 2022

(54) INFORMATION PROCESSING APPARATUS, INFORMATION PROCESSING METHOD, AND PROGRAM

(71) Applicant: SONY CORPORATION, Tokyo (JP)

(72) Inventor: Kenji Gotoh, Chiba (JP)

(73) Assignee: SONY CORPORATION, Tokyo (JP)

(*) Notice: Subject to any disclaimer, the term of this patent is extended or adjusted under 35 U.S.C. 154(b) by 201 days.

(21) Appl. No.: 16/476,618

(22) PCT Filed: Jan. 10, 2018

(86) PCT No.: PCT/JP2018/000274
§ 371 (c)(1),
(2) Date: Jul. 9, 2019

(87) PCT Pub. No.: WO2018/135343
PCT Pub. Date: Jul. 26, 2018

(65) Prior Publication Data
US 2019/0362131 A1 Nov. 28, 2019

(30) Foreign Application Priority Data
Jan. 19, 2017 (JP) .............................. JP2017-007449

(51) Int. Cl.
G06V 20/64 (2022.01)
H04N 13/275 (2018.01)
(Continued)

(52) U.S. Cl.
CPC .............. G06V 20/64 (2022.01); G06T 17/00 (2013.01); G06V 40/28 (2022.01); H04N 13/275 (2018.05); G06T 2200/08 (2013.01)

(58) Field of Classification Search
CPC ............ G06K 9/00201; G06K 9/00355; G06T 17/00; G04N 13/275
See application file for complete search history.

(56) References Cited
U.S. PATENT DOCUMENTS

2004/0085356 A1* 5/2004 Kake ..................... A63F 13/525
715/757
2005/0134607 A1* 6/2005 Purdy ................... G06T 11/206
345/629
(Continued)

FOREIGN PATENT DOCUMENTS

JP 2000-090288 A 3/2000
JP 2010-239499 A 10/2010
(Continued)

OTHER PUBLICATIONS

Okamoto et al., The development of breaststroke motion learning system by VRML, Technical Report of IEICE. Multimedia and Virtual Environment, Mar. 15, 2001, pp. 17-22, The Institute of Electronics, Information and Communication Engineers.

Primary Examiner — Kevin Ky
(74) Attorney, Agent, or Firm — Paratus Law Group, PLLC

(57) ABSTRACT

An information processing apparatus according to an embodiment of the present technology includes: an acquisition unit; and a generation control unit. The acquisition unit acquires an importance level relating to at least one part of an object. The generation control unit controls, on the basis of the acquired importance level, generation of a model of the object displayed in a virtual space.

17 Claims, 6 Drawing Sheets

(51) Int. Cl.
*G06T 17/00* (2006.01)
*G06V 40/20* (2022.01)

(56) References Cited

U.S. PATENT DOCUMENTS

| | | | | |
|---|---|---|---|---|
| 2012/0249741 | A1* | 10/2012 | Maciocci | G06T 19/006 348/51 |
| 2012/0293506 | A1* | 11/2012 | Vertucci | G06N 3/04 345/419 |
| 2014/0376789 | A1* | 12/2014 | Xu | G06T 5/50 382/128 |
| 2015/0050628 | A1* | 2/2015 | Mori | A61B 5/4088 434/236 |
| 2015/0294570 | A1* | 10/2015 | Emura | G06T 11/00 340/435 |
| 2016/0021360 | A1* | 1/2016 | Nishizawa | H04N 13/344 348/53 |
| 2016/0093036 | A1* | 3/2016 | Honda | G06F 3/0488 382/103 |
| 2016/0133054 | A1* | 5/2016 | Honjo | G06V 20/20 345/633 |
| 2017/0010662 | A1* | 1/2017 | Nishizawa | G06F 3/011 |
| 2018/0082144 | A1* | 3/2018 | Wakamatsu | G06V 10/255 |
| 2018/0201134 | A1* | 7/2018 | Choi | G06T 17/05 |
| 2018/0357836 | A1* | 12/2018 | Ishiguro | G06V 20/20 |
| 2019/0244416 | A1* | 8/2019 | Tamaoki | A63F 13/428 |
| 2019/0247751 | A1* | 8/2019 | Tamaoki | G06T 19/00 |
| 2019/0302901 | A1* | 10/2019 | Tian | G06F 1/163 |

FOREIGN PATENT DOCUMENTS

| | | |
|---|---|---|
| JP | 2011-039860 A | 2/2011 |
| JP | 2013-197740 A | 9/2013 |
| JP | 2015-132678 A | 7/2015 |

\* cited by examiner

| Scene | Importance level of face | Importance level of upper body | Importance level of lower body |
|---|---|---|---|
| Sports | High | High | High |
| Meal, restaurant | High | Middle | Low |
| Table game | High | Middle | Low |
| Conference | High | Low | Low |
| Class | High | Low | Low |
| Drive | Middle | Low | Low |
| Watching TV | Low | Low | Low |
| Movie theater, concert | Low | Low | Low |

FIG.4

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2018/000274 (filed on Jan. 10, 2018) under 35 U.S.C. § 371, which claims priority to Japanese Patent Application No. 2017-007449 (filed on Jan. 19, 2017), which are all hereby incorporated by reference in their entirety.

TECHNICAL FIELD

The present technology relates to an information processing apparatus, an information processing method, and a program that are applicable to generation of a model displayed in a virtual space or the like.

BACKGROUND ART

In the past, there has been known a technology for performing remote communication by sharing video and audio with each other via a network or the like. For example, users in remote places are capable of sending video and audio to each other in real time. As a result, it is possible to perform communication with the other party who is in a remote place while grasping the state of each other.

For example, Patent Literature 1 describes a television conference system capable of transmitting/receiving images and audio of users who are at different sites to/from each other. In Patent Literature 1, whether or not a user is making a gesture is determined on the basis of a captured image of the user. In the case where a gesture is made, an image of the upper body of the user is cut out from the captured image. In the case where a gesture is not made, an image of the face of the user is cut out. The cut-out image of the upper body or face of the user is transmitted to a terminal apparatus of the other party and displayed on a display. As a result, it is possible to smoothly conduct a television conference with gestures, and achieve favorable communication (paragraphs [0030], [0057], and [0092], FIG. 5, FIG. 6, and the like of the specification of Patent Literature 1).

CITATION LIST

Patent Literature

Patent Literature 1: Japanese Patent Application Laid-open No. 2010-239499

DISCLOSURE OF INVENTION

Technical Problem

In recent years, also a system that realizes remote communication by displaying a model of each user on a virtual space constructed by a computer system or the like has been developed. A technology capable of performing favorable communication on the virtual space is desired.

In view of the circumstances as described above, it is an object of the present technology to provide an information processing apparatus, an information processing method, and a program that are capable of performing favorable communication on a virtual space.

Solution to Problem

In order to achieve the above-mentioned object, an information processing apparatus according to an embodiment of the present technology includes an acquisition unit; and a generation control unit.

The acquisition unit acquires an importance level relating to at least one part of an object.

The generation control unit controls, on the basis of the acquired importance level, generation of a model of the object displayed in a virtual space.

In this information processing apparatus, the importance level of the at least one part of the object is acquired, and generation of the model of the object is controlled on the basis of the importance level. As a result, for example, it is possible to control a data amount in accordance with the importance level, and reduce the load of data transmission and the amount of processing calculation. As a result, it is possible to perform favorable communication on the virtual space.

The generation control unit may control a data amount of a corresponding part of the model of the object, the corresponding part corresponding to the at least one part of the object from which the importance level has been acquired.

As a result, it is possible to control the data amount of each corresponding part of the model of the object on the basis of the importance level. As a result, for example, it is possible to reduce the load of data transmission and the amount of processing calculation.

The generation control unit may increase a data amount of the corresponding part corresponding to a part from which a high importance level has been acquired, and reduce a data amount of the corresponding part corresponding to a part from which a low importance level has been acquired.

As a result, for example, it is possible to generate a corresponding part of the model of the object with a high importance level with high accuracy while suppressing the increase in the entire data amount. As a result, it is possible to perform favorable communication on the virtual space.

The generation control unit may control a data amount of generation data for generating the model of the object.

As a result, it is possible to control the data amount such as an image or the like of the object used for generating the model of the object. Therefore, it is possible to reduce the load of data transmission and the amount of processing calculation.

The generation data may include part data for generating each part of the model of the object. In this case, the generation control unit may control a data amount of the part data corresponding to the at least one part of the object from which the importance level has been acquired.

As a result, it is possible to control the data amount for each corresponding part of the model of the object on the basis of the importance level, and perform favorable communication on the virtual space.

The generation control unit may increase a data amount of the part data corresponding to a part from which a high importance level has been acquired, and reduce a data amount of the part data corresponding to a part from which a low importance level has been acquired.

As a result, for example, it is possible to generate a corresponding part of the model of the object with a high importance level with high accuracy while suppressing the increase in the entire data amount. As a result, it is possible to perform favorable communication on the virtual space.

The acquisition unit may acquire the importance level on the basis of information relating to the virtual space.

As a result, it is possible to generate a model depending on the situation or the like on the virtual space, and perform favorable communication.

The information relating to the virtual space may include information regarding a scene of the virtual space. In this case, the acquisition unit may acquire the importance level on the basis of the information regarding the scene.

As a result, it is possible to generate a model in accordance with the scene on the virtual space, and perform favorable communication.

The acquisition unit may acquire a high importance level for a main part relating to the scene of the virtual space, and a low importance level for a part that is not the main part.

As a result, for example, it is possible to increase the data amount of the main part relating to the scene to display it with a high resolution, and perform favorable communication on the virtual space.

The acquisition unit may acquire the importance level on the basis of motion of the object.

As a result, it is possible to generate a model in accordance with the movement of the object, and perform favorable communication.

The acquisition unit may acquire a high importance level for a main part relating to the motion of the object, and a low importance level for a part that is not the main part.

As a result, for example, it is possible to perform processing such as raising the importance level of the moving part of the object. As a result, it is possible to accurately reproduce the motion of the object, for example.

The acquisition unit may acquire the importance level on the basis of an instruction relating the importance level input from a user.

As a result, for example, it is possible to perform favorable communication via the model or the like of the user in which the part desired by him/her is displayed with high accuracy.

The acquisition unit may acquire the importance level on the basis of the importance level relating to a model of a different object displayed on the virtual space.

As a result, for example, it is possible to acquire the importance level similar to that of the model of the different object, and perform favorable communication.

The acquisition unit may acquire the importance level on the basis of motion relating to a model of a different object displayed on the virtual space.

As a result, it is possible to easily generate the model of the object in accordance with the motion or the like of the model of the different object. As a result, it is possible to perform favorable communication on the virtual space.

The acquisition unit may acquire the importance level on the basis of as instruction relating to the importance level of a model of a different object displayed on the virtual space, the instruction being input from a different user.

As a result, for example, it is possible to acquire an importance level similar to the importance level instructed by most of the users, and generate the model of the user is accordance with the communication.

An information processing method according to an embodiment of the present technology is an information processing method executed by a computer system, including: acquiring an importance level relating to at least one part of an object.

On the basis of the acquired importance level, generation of a model of the object displayed in a virtual space is controlled.

A program according to an embodiment of the present technology causes a computer system to execute the steps of:

acquiring an importance level relating to at least one part of an object; and controlling, on the basis of the acquired importance level, generation of a model of the object displayed in a virtual space.

Advantageous Effects of Invention

As described above, in accordance with the present technology, it is possible to perform favorable communication on virtual space. It should be noted that the effect described here is not necessarily limitative and may be any effect described in the present disclosure.

BRIEF DESCRIPTION OF DRAWINGS

FIG. 4 is a table showing an example of an importance level of each part of the body of a user in a scene.

MODE(S) FOR CARRYING OUT THE INVENTION

Hereinafter, embodiments according to the present technology will be described with reference to the drawings.

First Embodiment

[Virtual Space Generation System]

Figure 1:
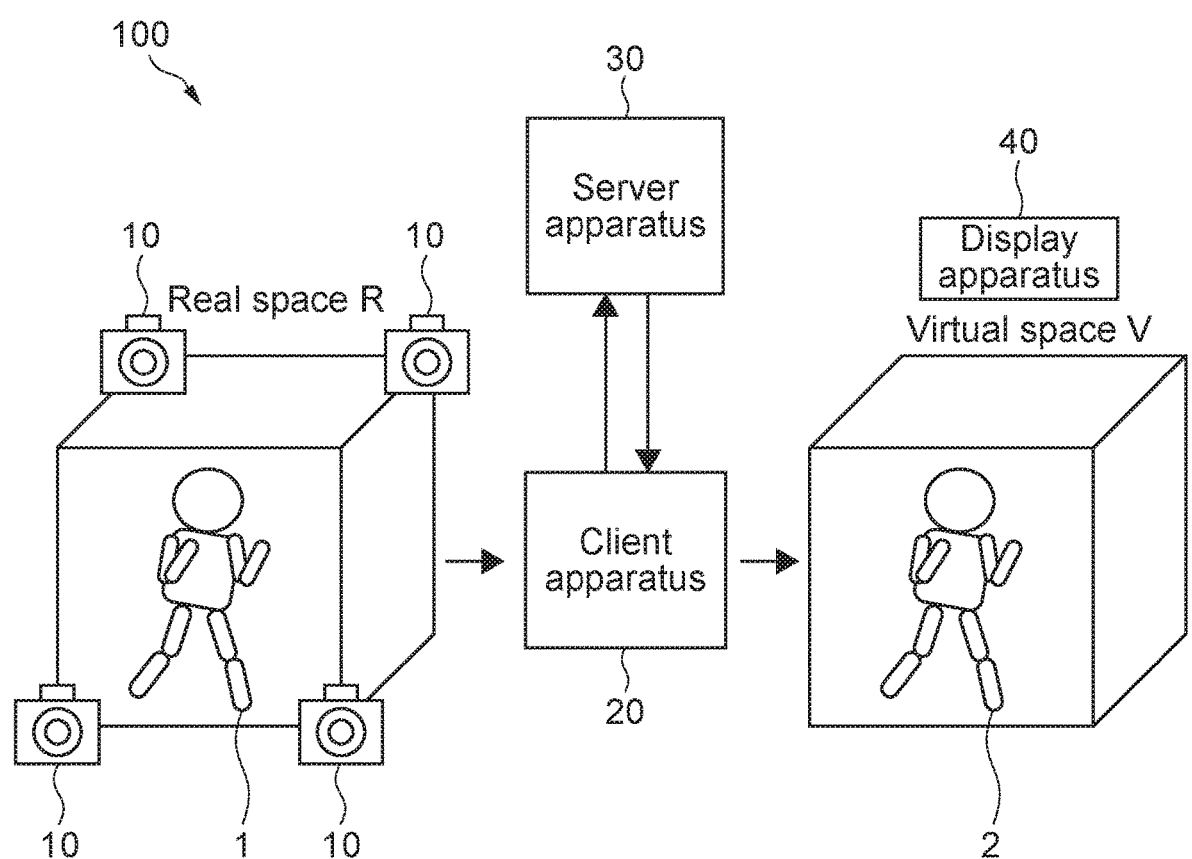
FIG. 1 is a schematic diagram showing for describing an outline of a virtual space generation system according to a first embodiment.

FIG. 1 is a schematic diagram describing an outline of a virtual space generation system according to a first embodiment of the present technology. A virtual space generation system 100 includes a plurality of cameras 10, a client apparatus 20, a server apparatus 30, and a display apparatus 40.

The plurality of cameras 10 images a user(object)1 in a real space R, and transmits an image or the like of the user 1 to the client apparatus 20. The client apparatus 20 generates generation data for generating a virtual model 2 of the user 1, and transmits it to the server apparatus 30. The server apparatus 30 generates a virtual space V including the virtual model 2 of the user 1, and transmits it to the client apparatus 20. The generated virtual space V is output to the display apparatus 40, and the virtual space V including the virtual model 2 is displayed.

As the virtual model 2, for example, a three-dimensional (3D) CG (Computer Graphics) or the like in which the state of the user 1, such as expression, posture, and motion is reproduced is generated. As will be described below, only a part of parts, such as a face, is reproduced, and default models may be displayed for other parts. Note that the target of the virtual model 2 is not limited to a person, and the virtual model 2 can be generated for an arbitrary object such as a pet and a robot.

As shown in FIG. 1, the plurality of cameras 10 are arranged at different positions with reference to a predetermined imaging area. Therefore, it is possible to acquire a plurality of images obtained by imaging the user 1 who has moved to the imaging area from various directions.

As the camera 10, for example, a digital camera including an image sensor such as a CMOS (Complementary Metal-Oxide Semiconductor) sensor and a CCD (Charge Coupled Device) sensor is used. Further, for example, a Depth camera or the like including a distance sensor such as a millimeter waver radar or an infrared laser may be appropriately used.

In this embodiment, a sound collection apparatus (illustration omitted) such as a microphone is disposed in the imaging area. The sound collection apparatus acquires audio of the user 1 at the same time as capturing an image of the user 1. As a result, for example, it is possible to perform communication such as conversation in the virtual space V. The type and the like of the sound collection apparatus are not limited, and a directional microphone or the like is appropriately used, for example.

As the display apparatus 40, for example, a display apparatus using liquid crystal, EL (Electro-Luminescence), or the like, a projector, or the like is used. The user 1 is capable of experiencing the virtual space V via his/her own avatar (virtual model 2) displayed on the display apparatus 40. Further, the display apparatus 40 worn and used by the user 1, such as an HMD (Head Mount Display), may be used. As a result, the user 1 is capable of enjoying the experience as if he/she were in the virtual space V. In addition, an arbitrary display device may be used.

The client apparatus 20 and the server apparatus 30 can be realized by, for example, an arbitrary computer such as a PC (Personal Computer) and a server system. In this embodiment, the client apparatus 20 corresponds to an embodiment of the information processing apparatus according to the present technology.

The connection form of the plurality of cameras 10, the client apparatus 20, the server apparatus 30, and the display apparatus 40 is not limited. For example, the respective apparatuses may be connected via a network such as a LAN (Local Area Network) and a WAN (Wide Area Network), or connected directly using a cable or the like.

For example, the plurality of cameras 10, the client apparatus 20, and the display apparatus 40 are disposed in the vicinity of the user 1, and only the server apparatus 30 is disposed on the network. Alternatively, the client apparatus 20 and the server apparatus 30 are disposed on the network. In addition, an arbitrary connection form and arbitrary arrangement of apparatuses may be adopted.

Figure 2:
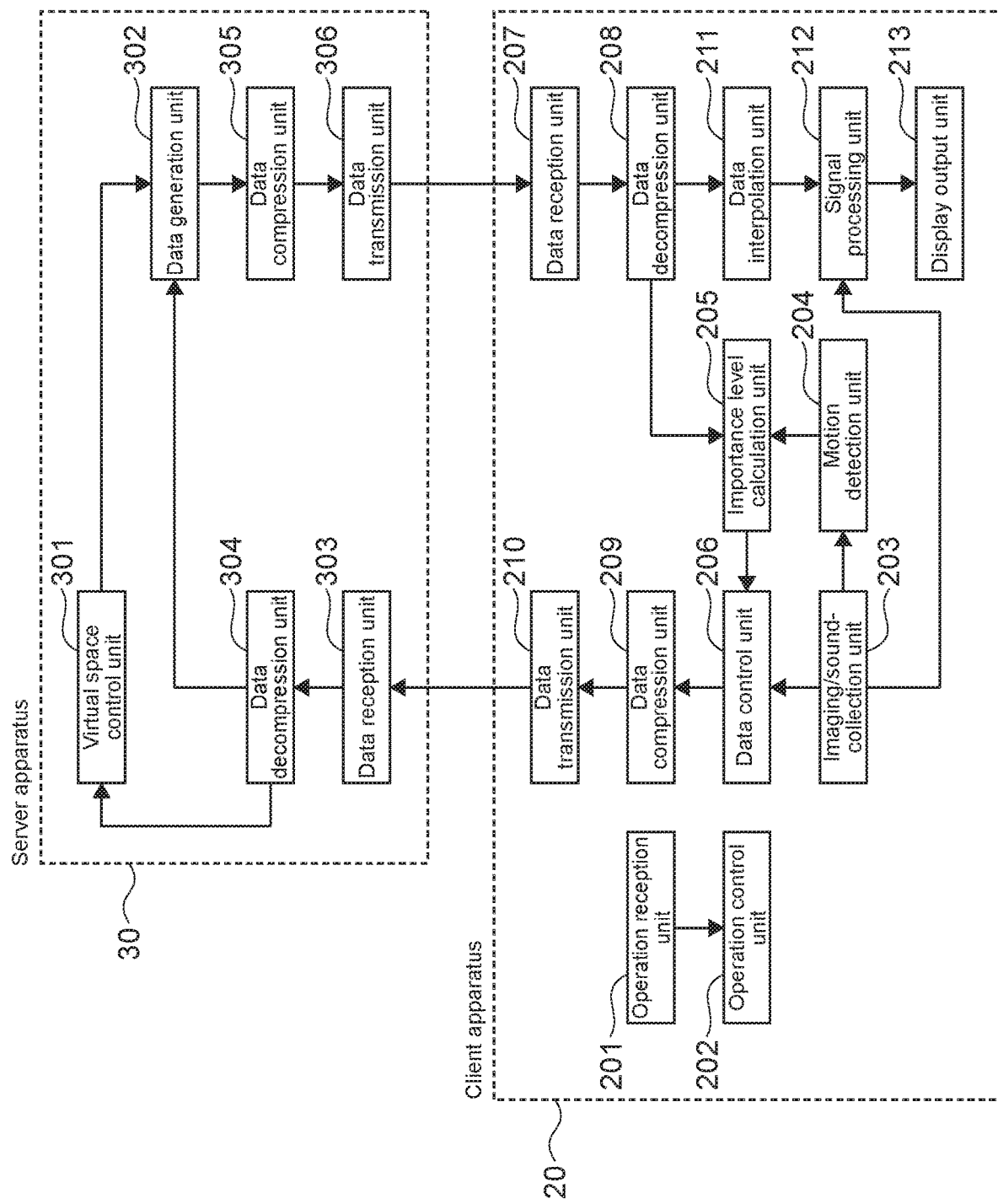
FIG. 2 is a block diagram showing a functional configuration example of a client apparatus and a server apparatus.

FIG. 2 is a block diagram showing a functional configuration example of the client apparatus 20 and the server apparatus 30. In FIG. 2, one client apparatus 20 user by the user 1 is connected to the server apparatus 30. In practice, a plurality of client apparatuses 20 used by other users sharing the virtual space V are connected to the server apparatus 30.

The client apparatus 20 includes hardware necessary for the configuration of a computer, such as a CPU (Central Processing Unit), a ROM (Read Only Memory), a RAM (Random Access Memory), and an HDD (Hard Disk Drive).

The CPU loads a program according to the present technology stored in the ROM or HDD into the RAM and executes it, thereby realizing the functional blocks shown in FIG. 2. Then, these functional blocks execute an information processing method according to the present technology.

Note that in order to realize the respective functional blocks, dedicated hardware such as a FPGA (Field Programmable Gate Array) and image processing IC (integrated Circuit) may be appropriately used.

The program is installed on the client apparatus 20 via various recording media, for example. Alternatively, the program may be installed via the Internet or the like.

As shown in FIG. 2, the client apparatus 20 includes an operation reception unit 201, an operation control unit 202, an imaging/sound-collection unit 203, a motion detection unit 204, an importance level calculation unit 205, and a data control unit 206. Further, the client apparatus 20 includes a data reception unit 207, a data decompression unit 208, a data compression unit 209, a data transmission unit 210, a data interpolation unit 211, a signal processing unit 212, and a display output unit 213.

The operation reception unit 201 accepts an instruction or the like input from the user 1 via an operation device such as a keyboard and a controller. For example, an instruction relating to the importance level described below, an instruction to specify the scene of the virtual space V, or the like is accepted. In addition, various instructions such as an instruction relating to the operation of the virtual model 2 and a local instruction such as adjustment of volume are accepted.

The operation control unit 202 controls respective functional blocks of the client apparatus 20 on the basis of an instruction from the user 1 accepted by the operation reception unit 201. Note that in the example shown in FIG. 2, connection (arrow) between the operation control unit 202 and the respective function blocs is omitted.

The imaging/sound-collection unit 203 generates image data of the user 1, which contains a plurality of images of the user 1 captured by the plurality of cameras 10. Further, the imaging/sound-collection unit 203 generates audio data of the user 1, which contains audio of the user 1 collected by a microphone or the like.

The motion detection unit 204 detects the motion of the user 1 on the basis of the image data of the user 1. In this embodiment, the amount of motion for each part of the body of the user 1 such as a head, both hands, both feet, and torso is calculated. For example, on the basis of the feature amount of the human body stored in advance, an area of the body of the user 1 is extracted from the image of the user 1. Then, each part of the body is detected by bone estimation (skeleton estimation) or the like. For each part, a motion vector that represents a deviation (motion) from the part detected in the past (e.g., one frame before) is calculated. On the basis of the direction or magnitude of the motion vector, the amount of motion of each part is calculated.

For example, in the case where the user 1 stands up and moves, the amount of motion of each part increases centering on both feet. In the case where the user 1 makes a gesture or the like using both hands at one place, the amount of motion of both hands of the user 1 increases, and the amount of motion of both feet and torso decreases. The method or the like of detecting the amount of motion is not limited, and an arbitrary image recognition technology or a method using machine learning or the like may be appropriately used.

The importance level calculation unit 205 calculates the importance level relating to each part of the body of the user 1. The importance level is a parameter relating to generation of the virtual model 2, and is typically reflected in the generation accuracy of each part. For example, in the virtual space V, a high importance level is set to a part that is desired to be displayed with high accuracy or a part that is necessary to be displayed with high accuracy.

For example, assumption is made that conversation is performed with another user while being seated, in the scene in which a meeting or the like is performed. In this case, since the expression or the like of the user 1 is important for communication, the importance level of the head of the user is set high. Meanwhile, since the lower body or the like of the user 1 displayed under the desk or the like is not particularly important, the importance level is set low.

In the case of playing tennis with another user in the scene or the like of a tennis game, since the movement of the whole body is important, the importance level of each part of the whole body of the user 1 is set high. Note that in the case where the expression cannot be seen in the scene or the like that looks over a tennis coat, the importance level of the head of the user 1 may be reduced, for example.

The method of calculating the importance level of each part of the user 1 (method of setting the importance level) is not limited. For example, a high importance level is calculated for main parts relating to the scene of the virtual space V or the movement or the like of the user 1, and a low importance level is calculated for non-main parts. The calculation of the importance level will be specifically described later. In this embodiment, the importance level calculation unit 205 corresponds to the acquisition unit that acquires the importance level relating to at least one part of an object.

The data control unit 206 generates generation data for generating the virtual model 2 of the user 1. The generation data is generated on the basis of image data of the user 1 and audio data input from the imaging/sound-collection unit 203. In this embodiment, the data amount of generation data is appropriately controlled on the basis of the importance level calculated by the importance level calculation unit 205.

Specifically, as the generation data, part data for generating each part of the virtual model 2 is generated. For example, part data is generated for each part such as a head, both hands, both feet, and torso. It goes without saying that how to divide the parts is not limited, and the parts can be divided into three parts, i.e., a head, an upper body, and a lower body.

The data control unit 206 controls data amount of part data of each part on the basis of the importance level of each part of the body of the user 1 acquired by the importance level calculation unit 205. For example, the data amount of part data corresponding to the part of the user 1 for which a high importance level is calculated is caused to increase.

For example, in the image data of the user, a part image with a high resolution is acquired as the image of the corresponding part (in this embodiment, although a plurality of part images captured in different directions is acquired, it will be referred to simply as "part image" and described). The part image with a high resolution corresponds to the part data whose data amount is controlled. Note that the resolution of the captured image corresponds to the high resolution referred to here in some cases. That is, the reference of increase/decrease of the data amount may be arbitrarily set, and increasing the data amount of part data may include acquiring the captured part image as it is.

Further, the data control unit 206 reduces the data amount of part data corresponding to the part of the user 1 for which a low importance level is acquired. For example, in the image data of the user 1, a part image with a low resolution is acquired as the image of the corresponding part. Typically, the resolution of the captured image is reduced. As a result, part data whose data amount is reduced is generated. Note that in the case where, for example, generation data with the resolution of the capture image being increased by default is generated, acquiring the captured part image as it is (acquiring without increasing the default resolution) may be included in the generation of part data whose data amount is reduced.

Note that in the present disclosure, the reduction includes deletion. That is, reducing the data amount of part data of the user 1 with a low importance level to zero is included. This means that the part data for the part of the user 1 with a low importance level is deleted.

Note that the data control unit generates setting data relating to various types of setting input by the user 1 in addition to the generation data. The setting data contains, for example, an instruction or the like to specify the scene of the virtual space V. In this embodiment, the data control unit 206 corresponds to the generation control unit.

The data reception unit 207 receives display data for displaying the virtual space V transmitted from the server apparatus 30. The display data contains 3D data and audio data of the virtual space V, information regarding the scene of the virtual space V, and the like. Note that the display data is compressed, and transmitted by the server apparatus 30.

The data decompression unit 208 decompresses the display data received by the data reception unit 207. The data compression unit 209 executes data compression in a predetermined compression format on the generation data and setting data input from the data control unit 206. The data transmission unit 210 transmits the generation data compressed by the data compression unit 209 to the server apparatus 30.

The compression format of the display data or generation data, the type of decompression processing, and the like are not limited, and arbitrary data compression/data decompression technology may be used.

The data interpolation unit 211 interpolates 3D data of the virtual space V transmitted from the server apparatus 30. For example, when being transmitted from the server apparatus 30, an object constituting the virtual space V or a part of the virtual model may be lost in some cases. The data interpolation unit 211 performs interpolation by estimating the interpolation data of the missing part and filling the missing part.

The generation of interpolation data is executed by using, for example, a library or the like storing 3D data of the past frame, default 3D data for each part of the virtual model, and the like. Alternatively, in accordance with the motion of the user 1, 3D data of each part according to the motion may be newly generated and used as the interpolation data. Further, it is also possible to interpolate the uttering motion of a face on the basis of audio data or the like. The method of estimating and interpolating the missing part is not limited, and an arbitrary CG processing technology and the like may be appropriately used.

A signal processing unit 212 generates, on the basis of the 3D data of the virtual space V output from the data interpolation unit 211, video data to be displayed on the display apparatus 40. For example, overhead video of the virtual model 2 or video viewed from the viewpoint of the virtual model 2 is appropriately generated. For example, on the basis of the movement, gaze direction, instruction, or the like of the user 1, viewpoint information containing the position of the viewpoint, direction, or the like with respect to the virtual space V is generated. On the basis of the viewpoint information, video data is generated. Another method may be used.

Further, the signal processing unit 212 generates audio data to be reproduced by an audio reproduction apparatus such as a speaker. That is, data of audio emitted from the virtual model 2, an object, or the like, is generated. The method of generating the video data and the audio data is not limited, and an arbitrary technology may be used.

The display output unit 213 outputs the data of video and audio of the virtual space V generated by the signal processing unit 212 to the display apparatus 40 or the audio reproduction apparatus.

The server apparatus 30 includes a virtual space control unit 301, a data generation unit 302, a data reception unit 303, a data decompression unit 304, a data compression unit 305, and data transmission unit 306.

The virtual space control unit 301 generates the virtual space V including the virtual model 2 of the user 1. In this embodiment, on the basis of the generation data transmitted from the client apparatus 20, the virtual model 2 of the user 1 is generated. Specifically, on the basis of the part data contained in the generation data, a corresponding part of the virtual model 2 corresponding to the part data is generated.

The corresponding part of the virtual model 2 corresponding to the part of the user 1 for which a high importance level calculated is generated on the basis of, for example, a part image (part data) with a high resolution. Therefore, the corresponding part with a high importance level is generated with a high data amount and high accuracy.

The corresponding part of the virtual model 2 corresponding to the part of the user 1 for which a low importance level is calculated is generated on the basis of, for example, a part image (part data) with a low resolution. Therefore, the corresponding part with a low importance level generated in a small data amount and suppressed accuracy. Note that for the part for which the part data is deleted, for example, a default part model or the like is used as the corresponding part. Typically, a part model with a sufficiently small data amount is used.

The method of generating the corresponding part of the virtual model 2 on the basis of a part image or the like is not limited. For example, a mesh model of the part is generated on the basis of a plurality of part images captured from different directions, or the and the color of skin on the surface, the color of clothes, or the like is added thereto. In addition, an arbitrary technology capable of generating a 3D model may be used.

The generated corresponding parts are combined to generate the virtual model 2 of the user 1 As a result, the virtual model 2 in which the accuracy of each part is controlled in accordance with the importance level generated. For example, in the scene in which a meeting or the like is performed, the virtual model 2 in which the accuracy of a head is high and the accuracy of a lower body or the like is low (or a default model) is generated. Alternatively, in the scene or the like of a tennis game, the virtual model 2 in which the accuracy of each part of the whole body is high is generated.

Further, the virtual space control unit 301 generates another element, of the virtual space V on the basis of the setting data transmitted from the client apparatus 20. For example, the virtual space V in which the scene specified from the user 1 is expressed is generated. In the case where it is a conference scene, the virtual space V including 3D models of the interior of the conference room, a desk, a chair, a white board, and the like is generated. The present technology is not limited thereto, and the virtual space V adapted to, for example, various scenes such as sports and meals is appropriately generated.

In the case of sharing the virtual space V with a different user, the virtual model 2 of the different user is generated. Also the virtual model 2 of the different user is also generated with the amount of data controlled on the basis of the importance level. The virtual model 2 of each user including himself/herself is appropriately disposed, and thus, the virtual space V is constructed.

The data generation unit 302 generated display data to be transmitted to the client apparatus 20. As described above, the display data contains the 3D data and audio data of the virtual space V, information regarding the scene of the virtual space V, and the like.

The data reception unit 303 and the data decompression unit 304 respectively receive and decompress the generation data or the like transmitted from the client apparatus 20. The data compression unit 305 and the data transmission unit 306 respectively compress the display data generated by the data generation unit 302 and transmit it to the client apparatus 20.

Figure 3:
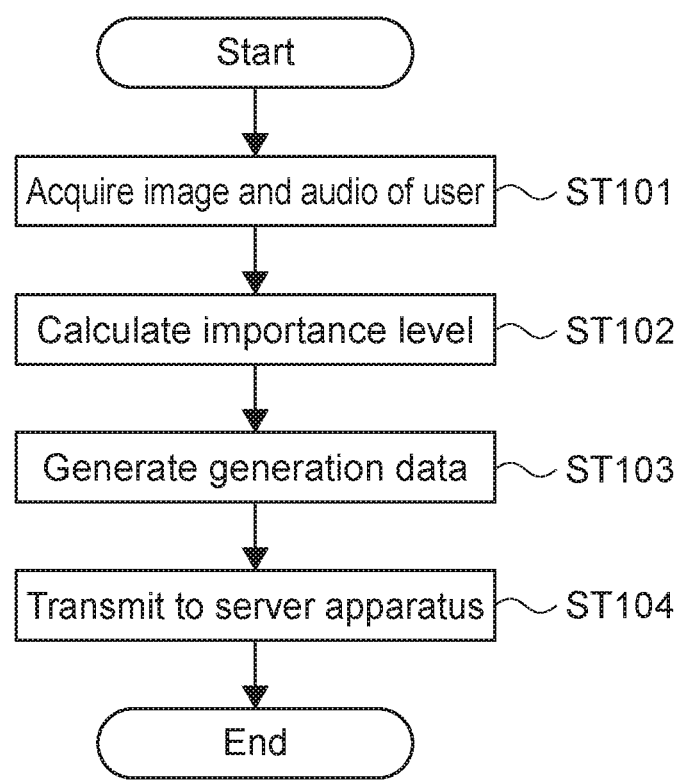
FIG. 3 is a flowchart showing an example of an operation of the client apparatus.

FIG. 3 is a flowchart showing an example of an operation of the client apparatus 20. First, the imaging/sound-collection unit 203 acquires an image of the user 1 and audio, and image data of the user 1 and audio data are generated (Step 101). The importance level calculation unit 205 calculates the importance level of each part of the body of the user 1 (Step 102).

As shown in FIG. 2, the data decompression unit 208 and the operation detection unit 204 are connected to the importance level calculation unit 205. Information regarding the scene of the virtual space V, or the like is input from the data decompression unit 208, and the amount of motion of each part of the body of the user 1 detected on the basis of the image data of the user 1 is input from the operation detection unit 204.

The importance level calculation unit 205 calculates the importance level on the basis of the input information regarding the scene of the virtual space V and the amount of motion of each part of the body of the user 1. Further, in the case where the importance level is specified by the user 1, the importance level is calculated in accordance with the specification. Hereinafter, the calculation of the importance level will be specifically described.

Figure 5:
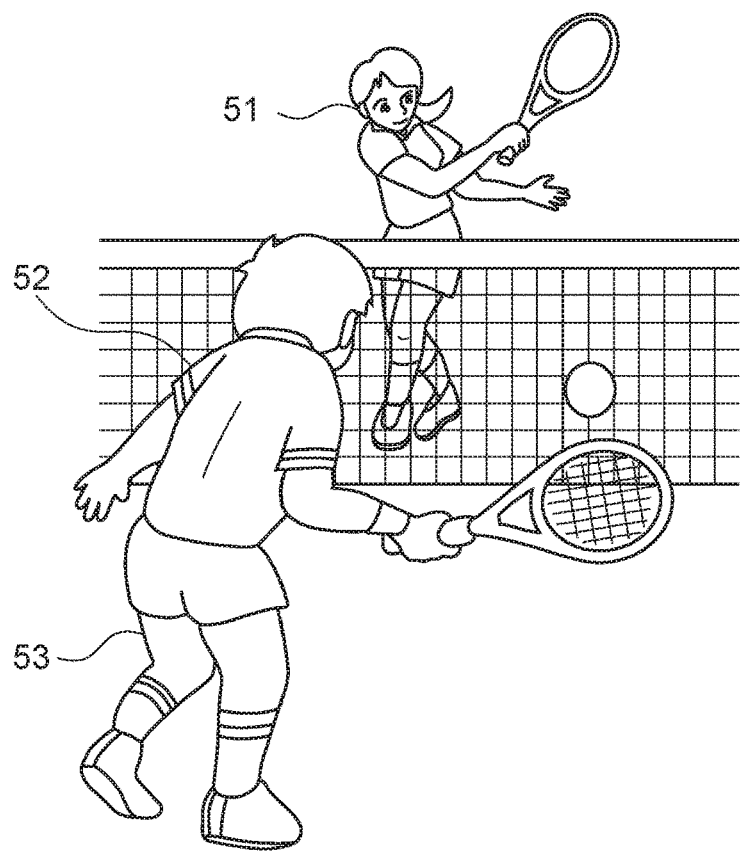
FIG. 5 is a schematic diagram describing an example of the scene.
Figure 6:
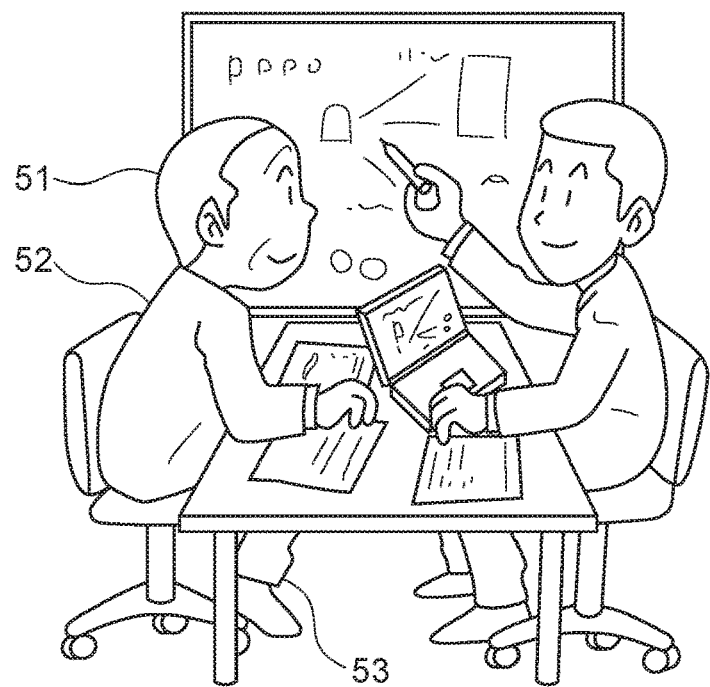
FIG. 6 is a schematic diagram describing an example of the scene.
Figure 7:
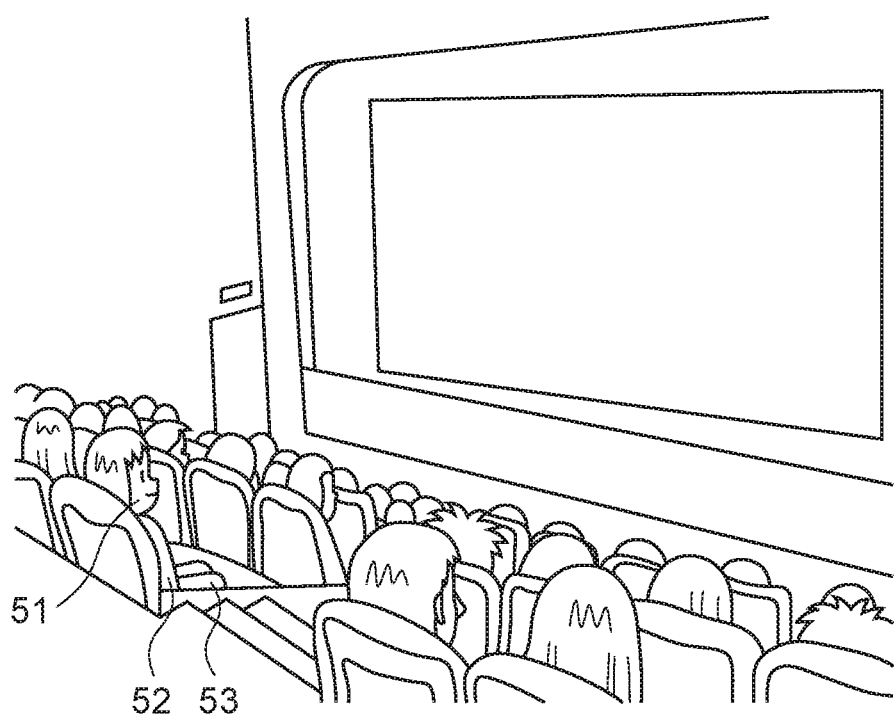
FIG. 7 is a schematic diagram describing an example of the scene.

FIG. 4 is a table showing an example of the importance level of each part of the body of the user 1 in a scene. FIG. 5 to FIG. 7 are each a schematic diagram describing an example of the scene.

In FIG. 4, the importance level of each part of the user 1 in a plurality of scenes assumed in the virtual space V is shown. Here, the importance level of a face, the importance level of an upper body, and the importance level of a lower body are shown. Examples of the assumed scene include scenes of sports, a meal/restaurant, a table game, a conference, a class, a drive, TV watching, and a cinema/concert. It goes without saying that in the virtual space, various scenes are assumed in addition to these scenes.

In the example shown in FIG. 4, the importance level of each part of the user 1 is shown in three stages, i.e., high, middle, and low. Regarding the setting of the importance level, typically, a high importance level set for the main part relating to the scene, and a low importance level is set for non-main parts. It goes without saying that which part is the main part relating to the scene may be arbitrarily set. Further, the importance level may be set on the basis he determination reference different from whether or not it is the main part.

Further, also how to express the importance level is not limited. The importance level may be set in not three stages of high, middle, and low but four stages, five stages or more. Further, the importance level may be expressed using a percentage (percent) or the like.

The importance level calculation unit 205 sets, on the basis of the table shown in FIG. 4, the importance level of each part of the face, the upper body, and the lower body of the user 1. In this embodiment, on the basis of the information regarding the scene of the virtual space V, for example, a table or the like in which data similar to that in the table of FIG. 4 is stored is referred to, and the importance level of each part of the user 1 is set.

For example, in the scene in which the user 1 is playing a tennis (sports) as shown in FIG. 5, the form of the user 1 such as a serve and bump, expression of the user 1, and the like are important. That is, a face 51, as upper body 52, and a lower body 53 of the user 1 are main parts relating to the scene of sports. Therefore, on the basis of the table shown in FIG. 4, a high importance level is set for the whole body (the face 51, the upper body 52, and the lower body 53) of the user 1.

Further, in this embodiment, it is also possible to dynamically change, on the basis of, for example, the amount of motion of the user 1, the importance level of each part set in relation to the scene. For example, in the case where the amount of motion of the whole body centering on the lower body 53 decreases, it is determined that he/she is in a break, and the importance level of each part is changed to a low value. It goes without saying that the importance level of the face 51 may be kept high because it is conceivable that conversation may take place during a break. Note that the reduction in the amount of motion is determined with reference to, for example, a predetermined threshold value.

In the case where the user starts walking and the amount of motion increases centering on the lower body 53, it is determined that the break is over and the play is resumed, and the importance level of each part is returned to a high value. By dynamically changing the importance level of each part on the basis of the motion of the user 1 as described above, it is possible to perform favorable communication with high quality.

As shown in FIG. 6, in the scene in which the user 1 is in a conference, the user 1 talks with another user while being seated. Therefore, the expression or the like of the user 1 is important, and the face 51 of the user 1 is the main part relating to the scene of the conference. Meanwhile, the scene of the conference, since the position of the hand of the user 1, the way of sitting, and the are not particularly important, the lower body 53 and the upper body 52 of the user 1 are non-main parts. Therefore, a high importance level is set to the face 51 of the user 1 on the basis of the table shown in FIG. 4, and a low importance level is set to each of the upper body 52 and the lower body 53.

For example, in the case where the amount of motion of the upper body 52 of the user 1 is higher than a predetermined threshold value, for example, it is determined that the user 1 is making a speech with gestures in the scene of a conference. In the case where a speech with gestures is performed, the motion or the like of the hand of the user 1 is important for communication. Therefore, the importance level of the upper body 52 is changed to a high importance level.

In the case where the amount of motion of the upper body 52 of the user 1 changes frequently, the possibility that the user 1 is the main speaker is high. Examples of such a case include the case where the user is giving a presentation. In such a case, for example, by lowering the threshold value relating to the amount of motion of the upper body 52 of the speaker (user 1), it is also possible to set the importance level of the upper body 52 of the speaker to easily increase. As described above, on the basis of the frequency or the like of the motion of the user 1, the importance level of each part of the user 1 may be changed.

In the case where the amount of motion of the lower body 53 of the user 1 in the scene of a conference or the like changes, for example, it is determined that the user 1 is standing up or walking. In such a case, the possibility that the user 1 is a main speaker is high, and the importance level of the upper body of the user 1 is set to easily increase, for example. As described above, on the basis of the change in amount of motion of the lower body 53, setting relating to the importance level of the upper body 52 may be performed.

In the scene in which the user 1 is watching a movie as shown in FIG. 7, the expression of the user 1, the movement of the body, and the like are not particularly important for communication. Therefore, the face 51, the upper body 52, and the lower body 53 of the user 1 are non-main parts in the scene of a cinema, and a low importance level is set for the whole body of the user 1 in accordance with the table shown in FIG. 4.

In the scene in which the user is watching a movie, it is conceivable that the user 1 performs an action such as stretching his/her body and rearranging his/her feet. Such motion is not particularly important for communication. Therefore, in the scene in which the user is watching a movie, or the like, it is not necessary to change the importance level of the upper body 52 or the like in some cases even in the case where the amount of motion of the upper body 52 of the user 1 or the like has changed. For example, it is also possible to set the threshold value relating to the amount of motion of the user 1 high in order to make it difficult for the importance level of each part of the user 1 to increase.

Further, in the case where the amount of motion of the lower body 53 of the user 1 largely increase during the movie, for example, it is determined that the user 1 has stood up to go to the bathroom or the like. In this case, since the walking motion or the like of the user 1 is not important, the amount of motion of the lower body 53 is not changed while remaining low. For example, whether or not the movie is being shown is determined on the basis of information regarding the scene of the virtual space V, and setting such as maintaining the importance level of the lower body 53 of the user 1 at a low value in the case where the movie is being shown. Note that in the case where the movie ends, the setting is switched to the setting in which the importance level of each part is changed on the basis of the amount of motion or the like of each part of the user 1.

In the case where the importance level relating to each part of the body is instructed from the user 1, the importance level of each part is changed in accordance with the instruction. For example, in the case where an instruction indicating that information or the like regarding the expression (face) is not necessary is input in the scene in which he/she is taking a class, or the like, the importance level of the face is set low. Further, in the case where an instruction to increase the importance level of the face is input when his/her expression at the time of watching a movie is desired to be reproduced with high accuracy in the scene of a cinema, or the like, the importance level of the face is increased. Since the importance level of each part can be changed on the basis of the instruction from the user 1, it is possible to perform favorable communication or the like desired by the user 1.

Returning to FIG. 3, the data control unit 206 generates generation data for generating the virtual model 2 of the user 1 (Step 103). In this embodiment, part data for generating the corresponding part of the virtual model 2 is generated as the generation data.

For example, in the scene in which a conference is being conducted in the virtual space V, a high importance level set to the face of the user 1. In this case, for example, as the part data relating to the face of the user 1, an image (part image) with a high resolution of the face of the user 1 generated. Further, in the case where a low importance level is set to the upper body and the lower body of the user 1, part images of the upper body and the lower body with a low resolution are generated. Therefore, the data control unit 206 controls the data amount of generation data by reducing the data amount of the part that is not important for communication while securing a sufficient data amount of the part that is important for communication in a virtual space.

Further, for example, a low importance level is set to the whole body of the user 1 in the scene in which he/she is watching a movie in the virtual space V. In the scene of a cinema, or the like, the illumination becomes dark and there is no need to reproduce the expression of the user 1. In this case, for example, processing can be performed such that the part image of each of the face, the upper body, and the lower body of the user 1 is not generated and the data amount of the part data is reduced to zero. Therefore, only audio data of the user 1 is generated as the generation data, and the data amount of generation data is sufficiently reduced. Note that the virtual model 2 of the user 1 can be expressed using, for example, an avatar or the like prepared by default.

As described above, the data control unit 206 is capable of controlling generation of the virtual model 2 by controlling the data amount of generation data for generating the virtual model 2 of the user 1. The generation data generated by the data control unit 206 is compressed by the data compression unit 209. Then, the compressed generation data is transmitted from the data transmission unit 210 to the server apparatus 30 (Step 104).

As described above, in the client apparatus 20 according to this embodiment, the importance level of at least one part of the user 1 is acquired, and generation of the virtual model 2 of the user 1 is controlled on the basis of the importance level. As a result, for example, it is possible to perform control or the like of the data amount corresponding to the importance level, and reduce the load of data transmission and the amount of processing calculation. As a result, it is possible to perform favorable communication on the virtual space V.

In order to improve the quality of remote communication on the virtual space V, for example, it is conceivable to appropriately use a technology for detecting a speaker, a technology for calculating the line of sight of the user 1, or the like. Further, a technology capable of suppressing the reduction in information necessary for communication desired by a user while suppressing the amount of information regarding video to be transmitted is also desired.

In this embodiment, the importance level calculation unit 205 calculates the importance level of each part of the body of the user 1. As a result, for example, it is possible to represent with high accuracy how much each part is required in communication on the virtual space V by using the importance level. Further, the data control unit 206 controls the data amount of part data of the virtual model 2 on the basis of the importance level of each part of the body of the user 1. As a result, a virtual model with high accuracy based on the importance level is generated.

That is, in this embodiment, it is possible to control the data amount of an image and the like for generating the virtual model 2 with high accuracy, and sufficiently suppress the amount of data to be transmitted via a network. Meanwhile, it is possible to generate a virtual model in which a part that is important for communication is generated with high accuracy. As a result, it is possible to sufficiently secure information necessary for communication desired by the user 1 while sufficiently reducing the load of data transmission and the amount of processing calculation.

In this embodiment, the importance level is calculated on the basis of the information regarding the scene of the virtual space V or the motion or the like of the user 1. Therefore, it is possible to calculate the importance level with high accuracy depending on various scenes or situations assumed in the virtual space V. As a result, the virtual model 2 or the like depending on the situation or the like on each occasion is displayed on the virtual space V, and the user 1 is capable of smoothly performing communication.

Second Embodiment

A virtual space generation system according to a second embodiment of the present technology will be described. In the following description, description of configurations and operations similar to those of the virtual space generation system 100 described is the above-mentioned embodiment will be omitted or simplified.

In a client apparatus according to this embodiment, information relating to a virtual model of a different user (different object) displayed on a virtual space is used in the processing of calculating the importance level (see Step 102 in FIG. 3). Specifically, the importance level relating to the virtual model of the different user, the motion relating the virtual model of the different user, and an instruction relating to the importance level of the virtual model of the different user input from the different user, and the like are used.

The importance level relating to the virtual model of the different user is an importance level of each part of the body of the different user, which is calculated by an importance level calculation unit of a client apparatus used by the different user. The motion relating to the virtual model of the different user is motion of the different user. That is, the amount of motion of each part of the body of the different user, which is detected by an operation detection unit of the client apparatus used by the different user, corresponds thereto. The instruction relating to the importance level of the virtual model of the different user is an instruction on the importance level that the different user inputs to each part of his/her virtual model.

The client apparatuses 20 used by a plurality of users are connected to the server apparatus 30 via a network. Therefore, in the server apparatus 30, the importance level of each part of the body of each user, the amount of motion of each part, instructions relating to the importance level, and the like are collected from each of the client apparatuses.

The data generation unit 302 of the server apparatus 30 transmits, to each of the client apparatuses 20, display data and information relating to the virtual model of the different user. In each of the client apparatuses 20, the information relating to the virtual model of the different user is input to the importance level calculation unit 205. Then, on the basis of the information and the like regarding the scene of the virtual space V, and the information relating to the virtual model of the different user, the importance level relating to each part of the body of the user 1 is calculated.

For example, in the case where the amount of motion of the upper body 52 and the lower body 53 of the opponent (different user) sharply decreases in the scene in which tennis is being played shown in FIG. 5, it is determined that the game has been interrupted because the opponent has suddenly taken a break, sat down, or started talking with a referee, for example. Then, the importance level of each of the upper body 52 and the lower body 53 of the user 1 is lowered accordingly.

After that, in the case where the amount of motion of the opponent has increased, it is determined that the game has been resumed, and the importance level of each part of the user 1 is increased again. As described above, by changing the importance level of the user 1 on the basis of the amount of motion of the different user, it is possible to easily control the display and the like of the virtual model 2 in accordance with the different user.

For example, a scene in which a game or practice of sports such as soccer and basketball in which a large number of players participate is performed is also assumed. In such a scene, in the case where the amount of motion of most players (most of the different users) is reduced, it is also possible to determine that they have taken a break. For example, in the case where the amount of motion of the upper body 52 and the lower body 53 of half or more players decreases, processing such as lowering the importance level of each part of the user 1 is executed.

Assumption is made that in the scene of the conference shown in FIG. 6, for example, the importance level of the upper body 52 of the other party (different user) of the conference is set high and the other party is speaking with gestures or the like. In this case, it is also possible to set the importance level of the upper body 52 of the user 1 assuming that they talk with each other with gestures.

Further, in the case where a high importance level is set to each of the upper body 52 and the lower body 53 of the other party, for example, it is determined that the other party is standing and giving a presentation or the like. In this case, since the user 1 is a listener, for example, processing such as changing the importance level of the upper body 52 and the lower body 53 to a lower level may be performed.

In the scene in which the user is watching a movie shown in FIG. 7, in the case where the amount of motion of most of the different users is small, it is determined that the different users are seated and the movie is being shown. In this case, the importance level of the whole body (the face 51, the upper body 52, and the lower body 53) of the user 1 is set low.

Further, in the case where the amount of motion of most of the different users in the cinema increases, for example, it is determined that the movie staff roll has been shown and the main story has ended. Therefore, for example, even in the case where showing of the movie has not been completely finished, processing such as changing the importance level of the whole body of the user 1 to a high value can be executed on the basis of the change in amount of motion of the different user. As described above, it is possible to dynamically change the importance level of the user 1 depending on the situation on each occasion, before the scene of the virtual space V is completely switched.

As another example, in the scene of a live concert, in the case where the amount of motion of different users in the live hall is large, for example, it is determined that the live is exciting. In this case, for example, the importance level of the whole body of the user 1 is changed to a high value, and the motion and the like of the user 1 are sufficiently expressed. Meanwhile, in the case where the amount of motion of the different user is small, for example, it is determined that the next song is being prepared, and the importance level of each of the upper body 52 and the lower body 53 of the user 1 is changed to a low value. As described above, the importance level of the user 1 is dynamically changed on the basis of the magnitude or the like of the amount of motion of the different user. As a result, it is possible to realize a virtual space with a sense of presence that matches the atmosphere of the live concert, and enjoy an advanced virtual experience.

Further, assumption is made that in the case where it is regular to perform a unique gesture using both arms at a predetermined timing in the scene of a live concert, many different users specify the importance level of both arms to a high value. In this case, the importance level of his/her both arms is raised in accordance with the specification of the different user. As a result, in the case where he/she makes the unique gesture in accordance with the movement of the surrounding different users (virtual models), the movement of his/her both hands is displayed with high accuracy, which makes him/her feel very uplifted and makes it possible to enjoy the concert.

Further, for example, in the case where most of the different users specify the importance level of the upper body to a low value in the scene in which he/she eats at a restaurant, it is determined that information regarding the upper body (motion or the like during the meal) is not important in the scene. In this case, for example, also the importance level of the upper body of the user 1 is changed to a low value. Meanwhile, in the case where most of the different users specify the importance level of the upper body 52 to a high value, it is determined that the motion or the like during the meal is important, and a high importance level is set to the upper body of the user 1.

As described above, by changing the importance level of the user 1 on the basis of the specification or the like relating to the importance level of the different user, it is possible to easily change the importance level of the part focused on in the communication. As a result, it is possible to perform very favorable communication.

Other Embodiments

The present technology is not limited to the above-mentioned embodiments, and various other embodiments can be realized.

In the above, as processing of controlling generation of a virtual model of a user, processing of controlling the data amount of part data (generation data) on the basis of the importance level of each part of the body of the user has been executed. Instead of this, at the time of generating a virtual model, the data amount of the corresponding part (model of each part) of the virtual model may be directly controlled on the basis of the importance level of each part of the body of the user.

For example, image data generated by an imaging/sound-collection unit of a client apparatus and the importance level of each part of the body of the user are transmitted to a server apparatus. The server apparatus generates, on the basis of the importance level of each part of the body, a virtual model of the user while appropriately controlling the data amount of the corresponding part.

For example, for a part for which a low importance level is set, a part model or the like having a small number of vertices of the mesh model (coarse mesh) or a low resolution on the surface is generated. Alternatively, a default part model or the like having a small data amount is generated. As a result, it is possible to reduce the data amount of the corresponding part corresponding to the part for which a low importance level is set.

For the part for which a high importance level is set, a part model or the like with a fine mesh and a high resolution is generated. As a result, it is possible to increase the data amount of the corresponding part corresponding to the part for which a high importance level is set. Note that the method of controlling the data amount of a 3D part model is not limited, and an arbitrary technology may be used.

As described above, the data amount of each corresponding part of the virtual model may be controlled on the basis of the importance level of each part of the body of the user. As a result, control of quality such as a resolution of each corresponding part based on the importance level is realized.

The virtual model in which the data amount of each corresponding part is controlled is transmitted to a client apparatus as display data. Therefore, it is possible to reduce the load and the like of data transmission of the display data while securing information and the like necessary for communication. Further, since the data amount of the corresponding part of the virtual model is directly controlled by the server apparatus, the arithmetic processing in the data control unit or the like of the client apparatus is sufficiently reduced. As a result, it is possible to avoid processing delays and the like in the client apparatus.

In the above, generation of a virtual model of a user imitating the appearance or the like of the user has been controlled. Instead of this, generation of avatar or the like having an appearance different from that of the user may be controlled. The avatar of the user is a character that operates in accordance with the motion of the user, and is generated on the basis of motion data of the like relating to the motion of the user. Therefore, when generating an avatar, an image or the like obtained by imaging the user is not necessarily required.

The motion data of the user is generated by motion capture. For example, a predetermined marker or the like is attached to each part of the body of the user, and the movement of each marker is detected as the motion of each part of the body of the user. The method or the like of the motion capture is not limited, and an arbitrary method such as an optical method, a gyro method, a magnetic method, and a video method may be used. Further, another technology or the like capable of detecting the motion of the user may be used.

For example, motion data of the user and the importance level of each part of the body of the user are generated by a client apparatus, and transmitted to a server apparatus. The server apparatus generates an avatar of the user on the basis of the importance level of each part of the user. For example, the corresponding part of the avatar corresponding to the part for which a low importance level is set is generated with a coarse resolution and a suppressed amount of data. Further, for example, the corresponding part of the avatar corresponding to the part for which a high importance level is set is generated with a high resolution and high accuracy.

As described above, the data amount of each corresponding part of the avatar may be controlled on the basis of the importance level of each part of the body of the user. As a result, it is possible to perform favorable communication via the avatar or the like.

All or a part of the functions of the above-mentioned server apparatus may be installed in the client apparatus. For example, the client apparatus may perform processing of generating the virtual model and the virtual space, and the like. In this case, for example, a connection form in which client apparatuses used by a plurality of users are connected to each other by a method such as P2P (Peer to Peer) without using a server or the like may be realized. Further, ail or a part of the functions relating to information processing among the functions of the client apparatus may be installed in the server apparatus. For example, the server apparatus may perform processing of calculating the importance level of each part of the body of the user, and the like on the basis of the amount of motion of each part of the body of the user detected by the client apparatus, or the like.

The functions of each of the client apparatus and the server apparatus may be distributed among apparatuses in accordance with the calculation load on the server apparatus and the client apparatus, the change in data transmission rate in a network or the like, the amount of data transmission, the delay of data transmission, and the like. For example, the client apparatus performs processing of generating a virtual model, and the like, in the case where the calculation load of the server apparatus is large, and the server apparatus may perform processing of generating a virtual model, and the like in the case where the calculation load on the server apparatus is reduced.

In the above, the case where the computer such as a PC, operated by the user executes the information processing method according to the present technology has been described. However, the information processing method and the program according to the present technology may be executed by another computer capable of communicating with the computer operated by the user via a network or the like. Further, the simulation system according to the present technology may be established by the cooperation of the computer operated by the user and another computer.

That is, the information processing method and the program according to the present technology can be executed not only in a computer system including a single computer but also in a computer system in which a plurality of computers operate in cooperation. Note that in the present disclosure, the system refers to a set of a plurality of components (apparatuses, modules (parts), and the like). Whether all the components are in the same casing or not is not considered. Therefore, both of a plurality of apparatuses stored in separate casings and connected via a network and one apparatus having a plurality of modules stored in one casing are systems.

The execution of the information processing method and the program according to the present technology by the computer system includes, for example, a case where a process of acquiring (calculating) the importance level of each part of the body of the user, a process of controlling generation of the virtual model of the user, and the like are executed by a single computer, and a case where each process is executed by different computers. Further, the execution of each process by a predetermined computer includes causing another computer to execute a part or all of the process and acquiring the result.

That is, the information processing method and the program according to the present technology are applicable also to the configuration of cloud computing in which one function is shared by a plurality of apparatuses via a network and processed in cooperation with each other.

At least two features of the above-mentioned features according to the present technology may be combined. Specifically, various features described in each embodiment may be arbitrarily combined without distinguishing the embodiments with each other. Further, the various effects described above are merely examples and are not limited, and additional effects may be exerted.

It should be noted that the present technology may take the following configurations.

(1) An information processing apparatus, including:

an acquisition unit that acquires an importance level relating to at least one part of an object; and a generation control unit that controls, on the basis of the acquired importance level, generation of model of the object displayed in a virtual space.

(2) The information processing apparatus according to (1), in which the generation control unit controls a data amount of a corresponding part of the model of the object, the corresponding part corresponding to the at least one part of the object from which the importance level has been acquired.

(3) The information processing apparatus according to (2), in which the generation control unit increases a data amount of the corresponding part corresponding to a part from which a high importance level has been acquired, and reduces a data amount of the corresponding part corresponding to a part from which a low importance level has been acquired.

(4) The information processing apparatus according to any one of (1) to (3), in which the generation control unit controls a data amount of generation data for generating the model of the object.

(5) The information processing apparatus according to (4), in which the generation data includes part data for generating each part of the model of the object, and the generation control unit controls a data amount of the part data corresponding to the at least one part of the object from which the importance level has been acquired.

(6) The information processing apparatus according to (5), in which the generation control unit increases a data amount of the part data corresponding to a part from which a high importance level has been acquired, and reduces a data amount of the part data corresponding to a part from which a low importance level has been acquired.

(7) The information processing apparatus according to any one of (1) to (6), in which the acquisition unit acquires the importance level on the basis of information relating to the virtual space.

(8) The information processing apparatus according to (7), in which the information relating to the virtual space includes information regarding a scene of the virtual space, and the acquisition unit acquires the importance level on the basis of the information regarding the scene.

(9) The information processing apparatus according to (8), in which the acquisition unit acquires a high importance level for a main part relating to the scene of the virtual space, and a low importance level for a part that is not the main part.

(10) The information processing apparatus according to any one of (1) to (9), in which the acquisition unit acquires the importance level on the basis of motion of the object.

(11) The information processing apparatus according to (10), in which the acquisition unit acquires a high importance level for a main part relating to the motion of the object, and a low importance level for a part that is not the main part.

(12) The information processing apparatus according to any one of (1) to (11), in which the acquisition unit acquires the importance level on the basis of an instruction relating the importance level input from a user.

(13) The information processing apparatus according to any one of (1) to (12), in which the acquisition unit acquires the importance level on the basis of the importance level relating to a model of a different object displayed on the virtual space.

(14) The information processing apparatus according to any one of (1) to (13), in which the acquisition unit acquires the importance level on the basis of motion relating to a model of a different object displayed on the virtual space.

(15) The information processing apparatus according to any one of (1) to (14), in which the acquisition unit acquires the importance level on the basis of an instruction relating to the importance level of a model of a different object displayed on the virtual space, the instruction being input from a different user.

REFERENCE SIGNS LIST

R real space
V virtual space
1 user
2 virtual model
10 camera
20 client apparatus
30 server apparatus
40 display apparatus
51 race
52 upper body
53 lower body
201 operation reception unit
202 operation control unit
203 imaging/sound-collection unit
204 motion detection unit
205 importance level calculation unit
206 data control unit
301 virtual space control unit
302 data generation unit
100 virtual space generation system

The invention claimed is:

1. An information processing apparatus, comprising:
an acquisition unit configured to acquire an importance level relating to each part of at least one part of an object in a real space; and
a generation control unit configured to control, on a basis of the acquired importance level relating to each part of the object, generation of a corresponding part of a model of the object displayed in a virtual space,
wherein the acquisition unit acquires the importance level on a basis of an amount of detected motion of each part of the object in the real space,
wherein the generation control unit controls the generation of each corresponding part of the model by controlling generation accuracy of the corresponding part on the basis of the acquired importance level relating to each part of the object, and
wherein the acquisition unit and the generation control unit are each implemented via at least one processor.

2. The information processing apparatus according to claim 1, wherein
the generation control unit controls a data amount of the corresponding part of the model of the object, the corresponding part corresponding to a corresponding part of the at least one part of the object in the real space from which the importance level has been acquired.

3. The information processing apparatus according to claim 2, wherein
the generation control unit increases the data amount of the corresponding part corresponding to each part from which a high importance level has been acquired, and reduces the data amount of the corresponding part corresponding to each part from which a low importance level has been acquired.

4. The information processing apparatus according to claim 1, wherein
the generation control unit controls a data amount of generation data for generating the model of the object.

5. The information processing apparatus according to claim 4, wherein
the generation data includes part data for generating each part of the model of the object, and
the generation control unit controls a data amount of the part data corresponding to the at least one part of the object from which the importance level has been acquired.

6. The information processing apparatus according to claim 5, wherein
the generation control unit increases the data amount of the part data corresponding to each part from which a high importance level has been acquired, and reduces the data amount of the part data corresponding to each part from which a low importance level has been acquired.

7. The information processing apparatus according to claim 1, wherein
the acquisition unit acquires the importance level on a basis of information relating to the virtual space.

8. The information processing apparatus according to claim 7, wherein
the information relating to the virtual space includes information regarding a scene of the virtual space, and
the acquisition unit acquires the importance level on a basis of the information regarding the scene.

9. The information processing apparatus according to claim 8, wherein
the acquisition unit acquires a high importance level for a main part relating to the scene of the virtual space, and a low importance level for a part that is not the main part.

10. The information processing apparatus according to claim 1, wherein
the acquisition unit acquires a high importance level for each part of the object for which the amount of detected motion is equal to or higher than a threshold motion value, and acquires a low importance level for each part of the object for which the amount of detected motion is less than the threshold motion value.

11. The information processing apparatus according to claim 10, wherein
the threshold motion value is determined according to a frequency of the detected motion of each part of the object in the real space.

12. The information processing apparatus according to claim 1, wherein
the acquisition unit acquires the importance level on a basis of an instruction relating the importance level input from a user.

13. The information processing apparatus according to claim 1, wherein
the acquisition unit acquires the importance level on a basis of the importance level relating to a model of a different object displayed on the virtual space.

14. The information processing apparatus according to claim 1, wherein
the acquisition unit acquires the importance level on a basis of motion relating to a model of a different object displayed on the virtual space.

15. The information processing apparatus according to claim 1, wherein
the acquisition unit acquires the importance level on a basis of an instruction relating to the importance level of a model of a different object displayed on the virtual space, the instruction being input from a different user.

16. An information processing method executed by a computer system, comprising:
acquiring an importance level relating to each part of at least one part of an object in a real space; and
controlling, on a basis of the acquired importance level relating to each part of the object, generation of a corresponding part of a model of the object displayed in a virtual space,
wherein the importance level is acquired on a basis of an amount of detected motion of each part of the object in the real space, and
wherein the generation of each corresponding part of the model is controlled by controlling generation accuracy of the corresponding part on the basis of the acquired importance level relating to each part of the object.

17. A non-transitory computer-readable storage medium having embodied thereon a program, which when executed by a computer system causes the computer system to execute a method, the method comprising:
acquiring an importance level relating to each part of at least one part of an object in a real space; and
controlling, on a basis of the acquired importance level relating to each part of the object, generation of a corresponding part of a model of the object displayed in a virtual space,
wherein the importance level is acquired on a basis of an amount of detected motion of each part of the object in the real space, and
wherein the generation of each corresponding part of the model is controlled by controlling generation accuracy of the corresponding part on the basis of the acquired importance level relating to each part of the object.

* * * * *